April 27, 1943.  E. R. EICHNER  2,317,956
LIQUID DISPENSING MECHANISM
Filed Sept. 13, 1941　2 Sheets-Sheet 1
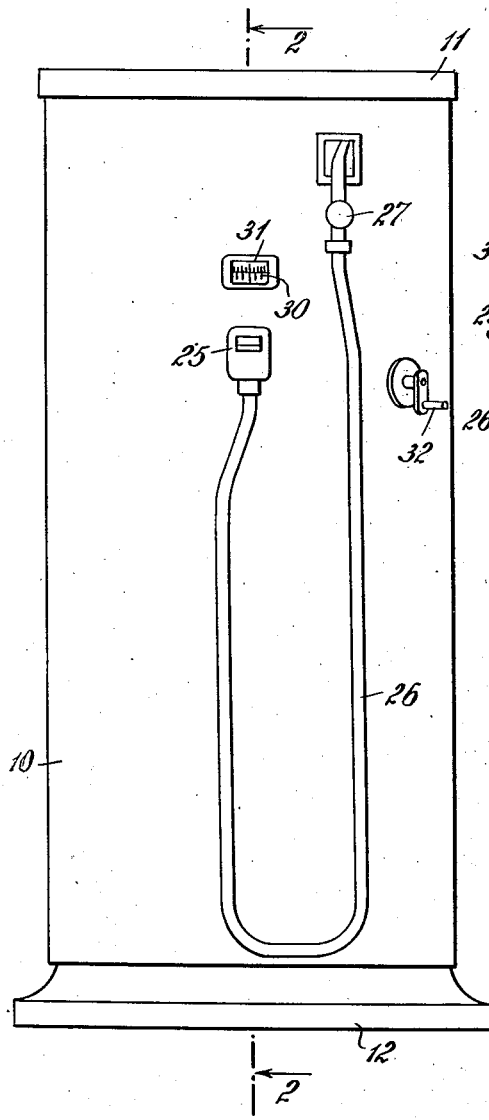
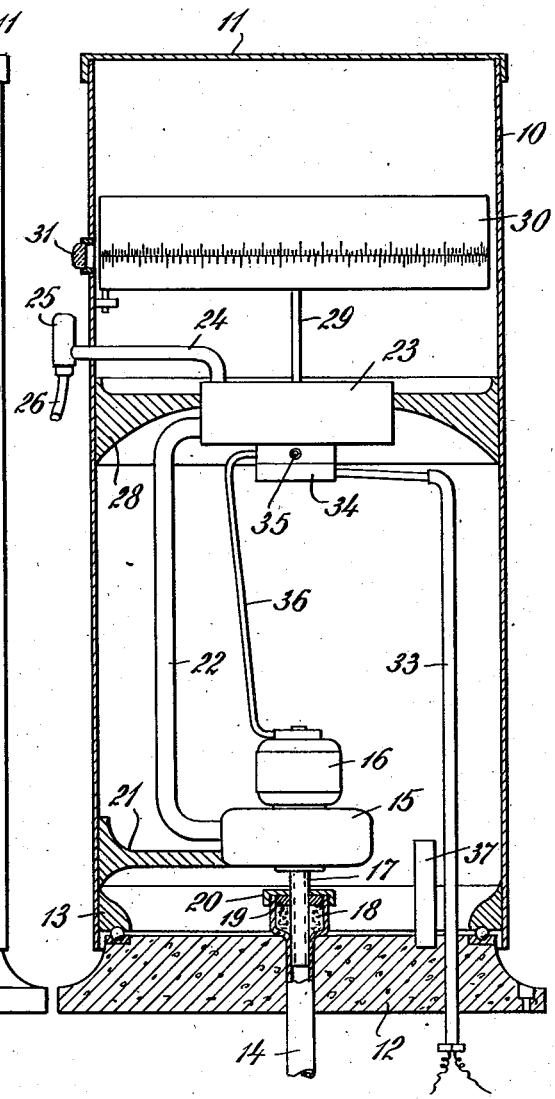
Edward R. Eichner
INVENTOR
BY Oswald G. Hayes
ATTORNEY

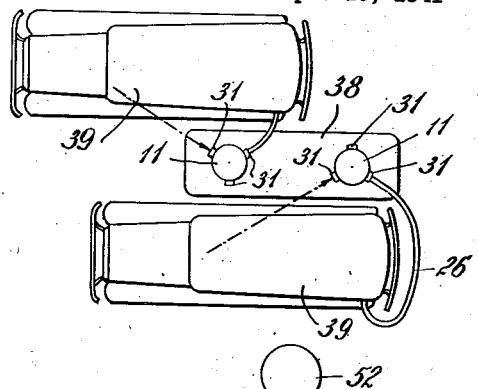
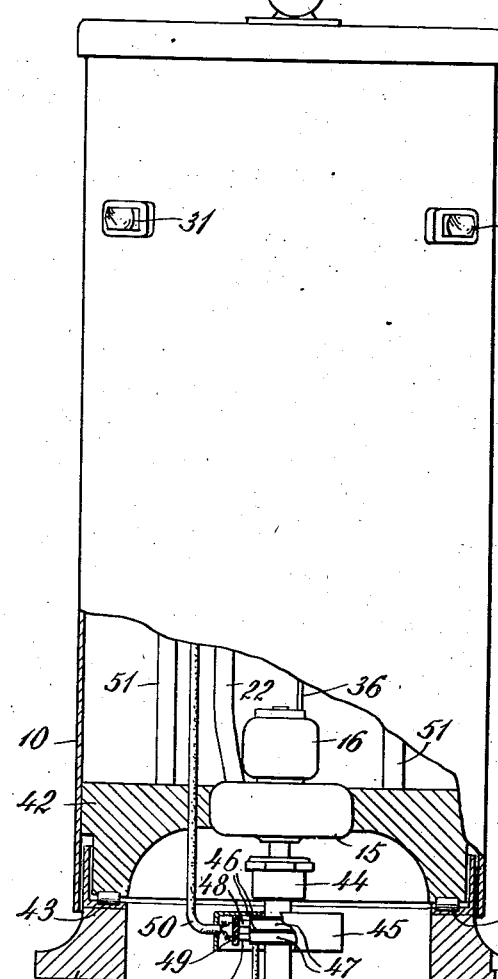

Patented Apr. 27, 1943

2,317,956

UNITED STATES PATENT OFFICE 2,317,956

LIQUID DISPENSING MECHANISM

Edward R. Eichner, Montclair, N. J., assignor to Socony-Vacuum Oil Company, Incorporated, New York, N. Y., a corporation of New York Application September 13, 1941, Serial No. 410,685

2 Claims. (Cl. 221—95)

This invention relates to devices for metered dispensing of liquids and is specifically directed to a device of the type known as "curb pumps" for dispensing gasoline and the like, indicating the quantity delivered and preferably also its cost.

Curb pumps as heretofore designed include a pump delivering liquid through a meter to a suitable hose for transfer to the tank of an automobile adjacent thereto. The meter is connected to an indicator of suitable construction. Usually the pump is motor driven and the electrical circuit supplying the motor includes a switch controlled by a hanger for the delivery hose and an interlock to prevent delivery after any one sale until the indicator has been reset to zero. All such pumps have the indicator so placed that it may be seen by the operator or any person standing in or near a line extending from the indicator at right angles to the longitudinal axis of a car beside the pump. Often the pump has an indicator on each side in order that deliveries may be made from either side of the pump.

It is extremely difficult for the driver of a car being serviced to read the delivery indicator of such curb pumps accurately. If the indicator can be read at all from the driver's position, the effect of parallax renders that reading inaccurate to a material degree. The driver must leave his seat to make an accurate reading.

The present invention contemplates a curb pump construction such that the driver of an automobile may accurately read an indicator of the amount delivered, and preferably also the cost thereof, without leaving his seat. This result is accomplished by mounting the body of the curb pump for rotation about its own vertical axis to place an indicator in the line of sight from the driver's seat to the pump. It is contemplated that such rotation of the pump shall also bring the hose into a position near and convenient to the inlet of the tank of a car to which the product is being delivered. The details of construction of a preferred embodiment of the invention are shown in the drawings annexed hereto, wherein:

Figure 1 is an elevation of a curb pump constructed in accordance with the invention;

Figure 2 is a sectional view on line 2—2 of Figure 1 showing dispensing elements of the device diagrammatically;

Figure 3 is a diagrammatic plan view showing two pumps of the present type on a conventional service station island; and Figure 4 is a partial sectional view of another embodiment of the invention.

Referring to Figures 1 and 2, the pump is enclosed in a casing 10, which may be transparent and is preferably generally cylindrical in shape and closed at its upper end by a removable cover 11 of a shape to prevent rain, dust, and the like from entering the casing 10. The casing 10 is supported by a ball bearing mounting on a suitable base 12, said mounting including a ball race in the base, a ball race in the under side of an annular shoulder 13 secured to the inner surface of the casing 10 and a suitable number of balls as well known in the art.

Projecting upwardly through the base 12 in the center line of the casing 10 is a pipe 14 from any suitable source of supply, such as an underground tank, not shown. A pump 15 and motor 16 to drive the same are mounted in the casing 10 above the pipe 14 and an intake pipe 17 for the pump 15 extends into the flared end of the pipe 14 and packing 18 therebetween is compressed by the bushing 19 under the force applied by a packing nut 20 on the upper end of pipe 14. While the motor and pump assembly may be retained in place solely by the engagement of pipes 14 and 17 and by the connections with other portions of the dispensing apparatus, it is preferred that this assembly be mounted on the casing 10, as by bracket 21. It will be apparent that the latitude of rotation of the casing 10 is limited by the bracket 21 and design of the bracket should take into consideration the degree of freedom desired in this respect.

The discharge of the pump 15 is connected by line 22 with a conventional meter 23, from which the liquid passes by line 24 to a "visi-gage" 25 of the usual construction to indicate by movement of a rotatable element flow of liquid from the device and to show whether the device is full. From the "visi-gage," liquid passes through a hose 26 and valved nozzle 27 to the tank of an automobile being serviced.

The meter 23 is supported in the casing 10 for rotation therewith by a spider 28 secured to the walls of the casing as by welding or the like. Arising along the center line of the casing from the meter 23 and driven thereby is a shaft 29 carrying an indicator drum 30 having division markings regularly spaced about the periphery thereof to indicate the quantity of liquid dispensed and preferably also the price of that quantity. The quantity and price indications are observable through windows 31 in the casing 10. The glass in each of said windows is preferably of the nature of a lens which will magnify the indicia on the drum 30 and at the same time will permit observation of the quantity and price indicator accurately from points of view in a relatively wide angle, and are preferably so spaced that one window is observable by the pump operator and at least one other window is observable by the driver of a car being serviced at the pump. In the embodiment shown, the casing 10 is provided with three windows 31 spaced about equally around the casing. It will be obvious that the number of windows may be varied as desired and that the angular spacing thereof need not be equal but may vary as desired. The indicia on drum 30 may be conveniently provided on bands showing the price for various quantities at different unit prices in order that a change in price makes it necessary to merely change bands.

It is also possible to provide bands each having several circumferential zones of identical price and quantity indicia at different levels to be used in combination with a casing having windows at different levels in order that the division marks may be spaced further apart.

Means such as the crank 32 are provided to reset the drum to zero indications and the reset mechanism is provided with an interlock to prevent closing the motor switch after it has been opened without resetting the indicator drum to zero. The interlock and the motor switch associated with the hanger for the nozzle 27 are conventional in the art and are therefore not shown here.

Electrical energy for operating the pump motor 16 is supplied through a conduit 33 passing through the base 12 to an explosion proof rotatable contact box 34. Connections for the motor switch and interlock above mentioned are made through a conduit fastened to opening 35 in the contact box 34. Energizing current passes from the contact box 34 to the motor 16 through a conduit 36.

It will be seen how the casing 10 may be rotated about its axis, carrying with it the pump and other dispensing and indicating equipment to present a window 31 in any desired direction as shown in Figure 3, which illustrates the relationship between each of two pumps mounted on a common pump island 38 and two automobiles 39 being serviced thereby. By rearrangement of elements and elimination of direct support for the motor and pump assembly from the casing 10, it is possible to permit rotation of the casing through 360°. However, this is not necessary in view of the several windows and the support of the bracket is therefore preferred. In the present embodiment, a stop pin 37 has been placed adjacent the conduit 33 to contact the bracket 21 before that member contacts conduit 33. If desired, other stop members may be employed to limit movement of the casing 10 and, if preferred, to place the limits of rotation at points corresponding with positions of the windows for sight by occupants of the drivers' seats of automobiles being serviced.

Figure 4 represents one modified form of the invention wherein the casing and pump assembly may be rotated through 360°. In this case, the curb pump is mounted on a cast iron base 40, tapped as at 41 for bolts to secure the same to a foundation. The curb pump, including the casing 10, pump 15, motor 16, meter and other operating mechanisms are supported from a spider 42, carried on the base 40 by a plurality of roller bearings 43. The suction line 14 connects with the intake of pump 15 through a suitable stuffing box 44 and a rotary contact box 45 of vapor-proof, explosion-proof construction is mounted concentrically about the suction line 14 below said stuffing box. The contact box includes a stationary cylindrical block of insulating material 46 having two bands of conducting material 47 about the periphery thereof supplied with current from conduit 33. The rotating exterior of the box carries two brushes 48 mounted in a suitable block 49 to contact said bands 47 and connected to conducting wires in conduit 50 which supplies electrical energy for operation of the pump, lights and the like. The meter and indicating drum assembly are readily mounted for indirect support from spider 42, as by bolting to the motor 16 or by posts 51 or in any other manner to give a rugged construction.

The general adaptability of the invention is illustrated by the provision of a visi-gage 52 on the top of the device in this embodiment. This visi-gage is preferably provided with an electric light bulb inside the device to thereby enhance its appearance.

I claim:

1. In gasoline dispensing apparatus, a housing mounted for angular displacement about a vertical axis, a dispensing hose anchored in said housing for rotation therewith, a drum register in the housing, and means for supporting said drum register for rotation with said housing and for driving it with respect to said housing in response to the dispensing of gasoline, said last-named means being supported in and fixed for rotation with said housing, said housing having at least two sight openings therein for viewing the drum register therethrough, one of said sight openings being adjacent the point of passage of the hose through the housing and the other being disposed a fixed angular distance away from the first in a position to be viewed by the operator of an automobile being serviced, whereby, when the housing is rotated to place the hose in dispensing position, the drum register and sight openings are bodily moved therewith, without change in relative position, to viewing position, while the drum register is rotatable relative to the sight openings in response to action of the driving means.

2. In gasoline dispensing apparatus, a base, a housing mounted on said base for angular displacement about a vertical axis, a stationary supply conduit extending through said base into said housing along said axis, a pump in said housing supported thereby for rotation therewith, means including a swivel joint for establishing a liquid passageway from said stationary conduit to the inlet of said pump, a drum register in the housing, metering means for supporting and rotatably driving said drum register in response to flow of gasoline therethrough, said metering means constituting the sole support for said drum register and being itself supported in and fixed for rotation with said housing, a conduit connecting the outlet of said pump with the inlet of said metering means, and a hose extending through a wall of said housing and attached to the outlet of said metering means, said housing having at least two sight openings therein through which the drum register may be viewed, one of said sight openings being adjacent the point of passage of the hose through the housing and the other being disposed a fixed angular distance away from the first in a position to be viewed by the operator of an automobile being serviced whereby the housing may be rotated by the hose when the latter is swung to dispensing position and the drum register and sight openings move therewith in the same relative positions for convenient viewing while the drum register is independently rotatable in response to driving action by the metering means.

EDWARD R. EICHNER.